No. 644,194. Patented Feb. 27, 1900.
C. E. BLAKE.
DISINFECTING DEVICE.
(Application filed May 3, 1898.)

(No Model.) 2 Sheets—Sheet 1.

Witnesses:
Will E. Collom
M. E. Gooley

Inventor:
Carlostine E. Blake.
By Paul O. Hawley
his attorneys.

No. 644,194. Patented Feb. 27, 1900.
C. E. BLAKE.
DISINFECTING DEVICE.
(Application filed May 3, 1898.)
(No Model.) 2 Sheets—Sheet 2.

Witnesses:
C. E. Van Doren
M. E. Gooley

Inventor:
Carlostine E. Blake.
By Paul D. Hawley
his attorneys.

UNITED STATES PATENT OFFICE.

CARLOSTINE E. BLAKE, OF MINNEAPOLIS, MINNESOTA.

DISINFECTING DEVICE.

SPECIFICATION forming part of Letters Patent No. 644,194, dated February 27, 1900.

Application filed May 3, 1898. Serial No. 679,595. (No model.)

*To all whom it may concern:*

Be it known that I, CARLOSTINE E. BLAKE, of the city of Minneapolis, county of Hennepin, State of Minnesota, have invented certain new and useful Improvements in Disinfecting Devices, of which the following is a specification.

This invention relates to disinfecting and deodorizing devices for use in sick-rooms, toilet-rooms, and like places.

The object of the invention is to provide a deodorizing, disinfecting, and germicidal agent in a dry, portable, and convenient form and without the usual glass or metal vessel to contain the same.

The invention consists generally in the combination of a porous vessel, preferably in the form of a hollow ball containing a suitable disinfectant, with a cover or shell inclosing said vessel and composed of disinfecting or deodorizing material, preferably crystalline in formation, and which prevents the too-rapid evaporation of the contents of said porous vessel, while the cover or shell itself throws off a germicidal, disinfecting, or deodorizing vapor, all substantially as hereinafter described.

The invention will be more readily understood by reference to the accompanying drawings, in which—

Figure 1:
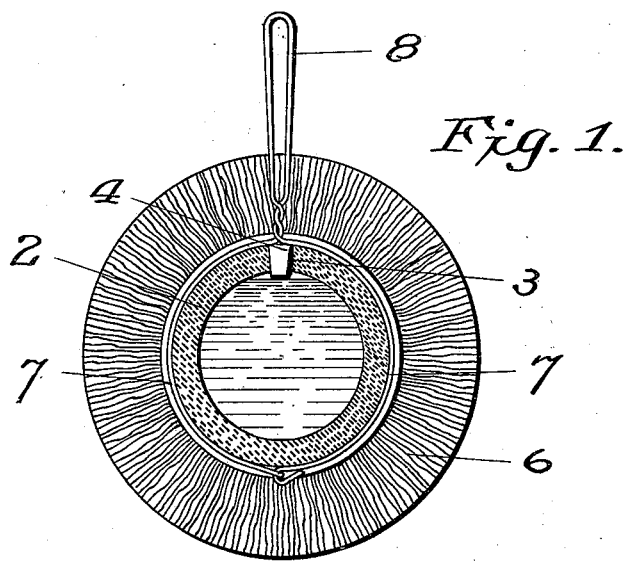
Figure 2:
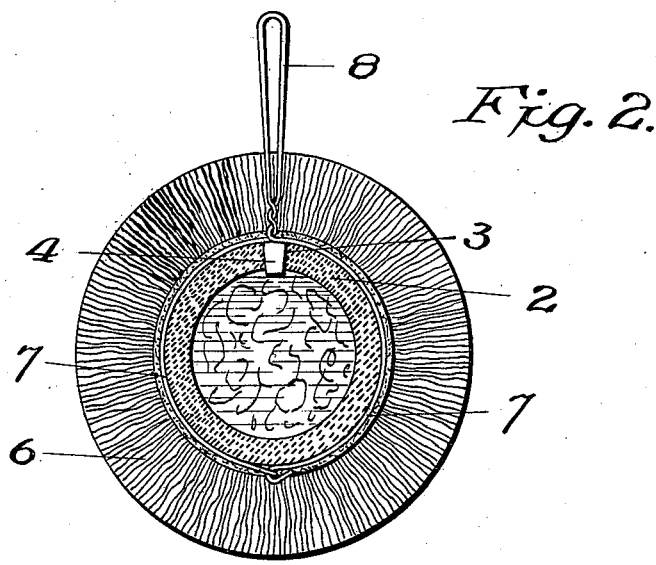
Figure 3:
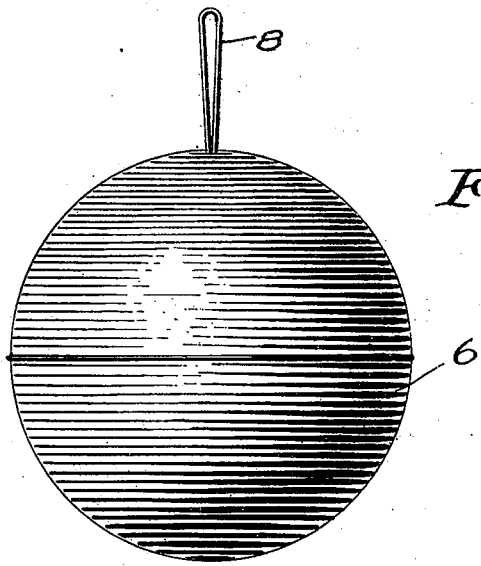
Figure 5:
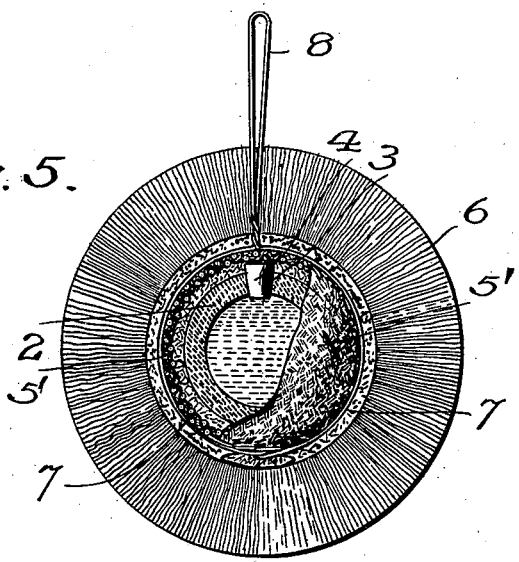
Figure 4:

Figure 1 is a sectional view of a disinfecting ball or device embodying my invention. Fig. 2 is a similar view showing absorbent material in the porous vessel or ball. Fig. 3 shows the exterior of the disinfecting-ball. Fig. 4 represents the exterior of the porous ball. Fig. 5 is a sectional view of a modification of my invention.

As shown in the drawings, 2 represents a hollow ball or vessel, the walls of which are porous. This ball is preferably made of clay mixed with fine sawdust or like material, which latter is burned in baking the ball, so as to make the ball porous. This porous vessel is filled with a composition of disinfecting and germicidal materials, which composition preferably comprises four parts of formalin and three parts each of carbolic acid, menthol, thymol, and eucalyptol. The ball may be filled by a process of absorption; but I prefer to provide the same with a hole 3, that is closed by a cork or by a block of clay 4 after the ball is filled with the liquid composition. The porous nature of the ball or vessel causes the slow conduction of the liquid to the surface thereof, from which the liquid slowly evaporates and passes off in the form of a vapor that is useful in the destruction of germ life and disagreeable odors.

To prevent a too-rapid evaporation of the germicidal agent, I inclose the porous vessel in a thick shell 6 of a preferably crystalline volatile substance. This is molded upon the ball or vessel and assumes its crystalline formation when cooled. This substance is in itself a disinfecting and deodorizing agent, the vapor thereof combining with the vapor from the contents of the porous vessel. The composition of the shell 6 is preferably thirteen parts of naphthalene, two parts of gum-camphor, and one part of oil of peppermint or paraffine. Both the oil and the paraffine may be used, if desired, and either one will protect the surface of the ball against rapid destruction by moisture. I prefer to use oil of peppermint, as it protects the ball from moisture, as above stated, and also scents the same.

As the oil or the paraffine of the shell composition would be apt to close or seal the pores of the vessel 2 when being molded thereon, I prefer to roll or dip the porous ball 2 in a powder or paste composed of plaster or chalk, (see 5, Figs. 1 and 2,) which prevents the entrance of the oil or the camphor-wax to the surface of the ball and does not interfere with the process of evaporation when the ball is finished.

As it is often desired to suspend the balls or cakes, I wrap a wire 7 about the ball before the shell is molded thereon and form a loop 8 in the wire as a means to suspend the ball in desired places. The wire loop is also useful as a means to suspend the ball in the mold, wherein the shell is formed upon the porous ball.

As indicated in Fig. 2, the porous ball may be filled with absorbent cotton or like material to assist in the distribution of the liquid therein and to partly counteract the capillary attraction of the porous walls of the ball.

Fig. 5 illustrates a modification of my invention wherein a thick layer of such germicidal agent as chloride of lime is arranged upon the porous ball and within the shell 6. For convenience I prefer to apply this layer by means of cloth or felt 5', both sides of which are covered with a paste of the disinfecting material. The cloth also acts as a wick to distribute the liquid from the ball to all parts of the inner layer.

Having thus described my invention, I claim as new and desire to secure by Letters Patent—

1. The combination, in a disinfecting device, of a porous vessel containing a disinfecting agent with an inclosing volatile shell, also of a porous nature.

2. The combination, of a porous vessel containing germicidal agents, with a shell of camphorous material molded upon said vessel, substantially as described.

3. The combination, of a porous vessel containing a disinfecting material, with an inclosing shell of volatile material containing an element that protects the same from the rapid action of moisture, substantially as described.

4. The combination, of a porous vessel containing disinfecting or germicidal agents, with a shell of volatile material containing a suitable proportion of oily substance for the purpose described, and a layer of material between said vessel and said shell, substantially as described.

5. The combination, of a porous vessel containing disinfecting agents, with an inclosing shell composed of disinfecting material molded thereon, and a layer of disinfecting material interposed between said vessel and said shell, substantially as described.

6. A disinfecting device, comprising a shell of volatile substance, and a body of disinfecting substance inclosed within said shell and arranged to evaporate through and with the volatile substance forming said shell.

7. A disinfecting device, comprising a shell of suitably-scented naphthalene or moth-camphor, and inclosing a vessel containing formalin and carbolic acid that are evaporated through and with said naphthalene, substantially as described.

In testimony whereof I have hereunto set my hand, this 23d day of April, 1898, at Minneapolis, Minnesota.

CARLOSTINE E. BLAKE.

In presence of—
C. G. HAWLEY,
M. E. GOOLEY.